Feb. 2, 1960
M. S. REYNOLDS
2,923,158
SAMPLE CONTAINER FOR MEASURING THE
DENSITY OF VOLATILE LIQUIDS
Filed Oct. 2, 1957
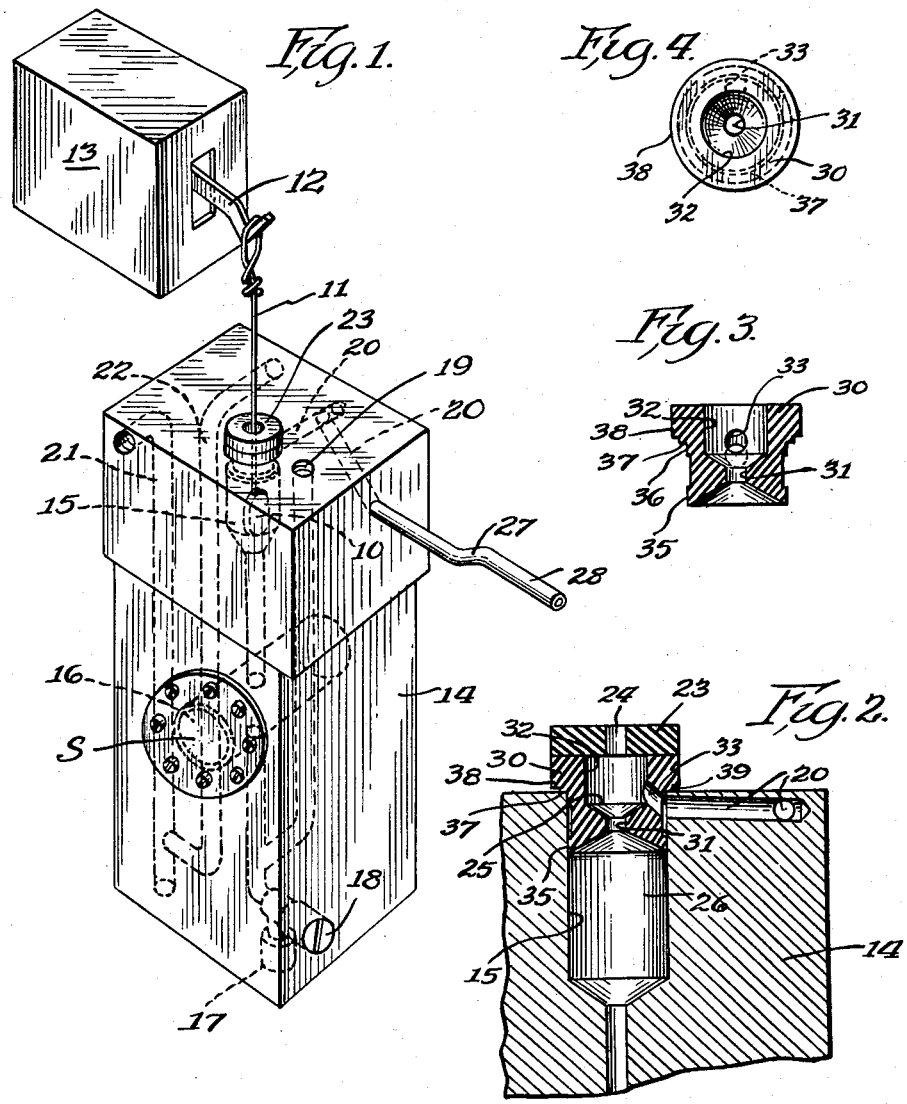
Inventor
Manning S. Reynolds
By Mann, Brown & McWilliams,
Attys.

2,923,158
Patented Feb. 2, 1960

2,923,158
SAMPLE CONTAINER FOR MEASURING THE DENSITY OF VOLATILE LIQUIDS

Manning S. Reynolds, Chicago, Ill., assignor to Central Scientific Company, Chicago, Ill., a corporation of Illinois Application October 2, 1957, Serial No. 687,727

6 Claims. (Cl. 73—437)

This invention relates to a density-measuring apparatus wherein a gravimetric weighing device is actuated by a bob of known weight and volume immersed in a sample liquid that is confined in a stationary container.

In applying apparatus of this type to measurement of the density of volatile liquids, erroneous readings have resulted due to the difficulties in maintaining the liquid sample at a truly uniform and accurate temperature.

It is the principal object of the present invention to provide a sample container arrangement for liquids wherein the liquids are maintained at an accurate, uniform temperature to insure accurate density measurements.

According to the invention, this is accomplished by limiting evaporative cooling at the surface of the liquid sample, limiting heat transfer by convection of the cooler surface layers to the main body of liquid, and limiting heat transfer by conduction from the main body of liquid to the surface.

Other objects and advantages will become apparent during the course of the following description.

In the accompanying drawings forming a part of this specification and in which like numerals are employed to designate like parts throughout the same, Fig. 1 is a perspective view illustrating the apparatus of the present invention in association with a weighing device;

Fig. 2 is a fragmentary sectional view better illustrating the construction and mounting arrangement of the insert of the present invention;

Fig. 3 is a sectional view of the insert itself; and

Fig. 4 is a plan view of the insert.

For purposes of disclosure the invention is described in connection with an arrangement for determining the hydrogen density in liquids by determining the electron density and specific gravity of the unknown liquid sample.

Such an arrangement may include a source of beta rays S positioned for emission through the sample, with the extent of absorption of the beta rays by the sample providing an indication of the electron density  Apparatus for making such determinations is well known and forms no part of the present invention, which is concerned primarily with a liquid sample container for improving the accuracy of the specific gravity or density determinations. In addition, however, the liquid sample container of the invention facilitates making the measurements of electron density and specific gravity at identical temperature conditions, and this is vital.

The liquid sample container arrangement of the invention receives a bob 10 of known weight and volume for immersion in the unknown liquid sample. The bob is suspended by a thin wire 11 from the weighing hanger 12 of an accurate gravimetric weighing device or balance 13 of any suitable type. The balance and sample container are mounted in fixed relation.

The container itself is in the form of a block-shaped body 14 approximately drilled to provide an open-topped reservoir 15, a sample cell 16, a drain outlet 17 and control valve 18 therefor for the sample cell, a fill passage 19 for the sample cell and reservoir, and an overflow passage 20 for the reservoir. The body is also provided with internal passages 21 and 22 for connection to a constant-temperature source of water for accurately maintaining the body and liquid sample at a desired constant temperature. In this connection the body may be of copper as its high thermal conductivity is best adapted for uniformly maintaining a desired constant temperature. For certain applications involving corrosive liquid samples, aluminum may be employed as it is also of high thermal conductivity.

A cover 23 is provided for the top of the reservoir, with the wire 11 being freely movable through a small passage 24 formed centrally therethrough.

The present invention recognizes that, to maintain a uniform and constant temperature in the reservoir and in the sample cell, evaporating cooling at the surface of the liquid must be inhibited. The vapors given off at the surface 25 of the liquid sample 26 are heavier than air and would normally settle on the surface of the liquid sample and thereby establish an equilibrium and prevent further evaporation; however, the presence of the overflow passage which is at the level of the surface of the liquid allows these vapors to escape. The downward flow of the vapors through the overflow tube draws fresh air through the support wire passage 24 in the container cover, and evaporation and escape of additional vapor from the surface of the sample proceeds in a continuous manner.

Such an evaporation cycle results in cooling the surface regions of the liquid, with these cooler and, hence, denser regions then moving downwardly by convection until the temperature pattern in the sample container becomes irregular.

In the arrangement of the present invention, the overflow passage 20 is provided with a liquid trap, and the container is filled with the liquid sample which is introduced through the fill passage 19 until the sample reaches a level determined by the overflow tube and, in fact, fills the trap provided in the overflow tube. The liquid in the trap blocks the escape of the vapors and a vapor-liquid equilibrium is established to prevent further evaporation.

The trap 27 is preferably formed in a glass tube 28 that is extended from the overflow passage to allow for visual inspection, though obviously the trap could be provided in the overflow passage within the container itself.

Since the described trap arrangement will not completely eliminate evaporative cooling at the surface of the liquid sample, it is important to limit the effects upon the main body of liquid of such surface cooling as does occur by limiting heat transfer therebetween.

Accordingly, the top of the reservoir receives an insert 30 of material having good thermal-insulating characteristics. The insert may be machined from a one-inch diameter polyethylene rod, and it is formed with a central passage having a region 31 of reduced diameter that flares out to form an open-topped well 32 for the surface regions of the liquid sample. The well communicates with the overflow passage 20 of the container body through a bore 33 that extends diagonally downwardly through the side wall of the insert.

The reduced region of the passage consistent with the requirement of providing clearance for free vertical movement of the wire 11 is made of minimum size for inhibiting the development of convection currents between the portion of the liquid sample in the well and the main body. A diameter on the order of one-sixth of an inch has been employed and has essentially eliminated convection currents between the surface liquid and the main body of liquid.

It is also important to limit heat transfer by conduction through the insert body from the main body of liquid to the surface portions, and the thermal-insulation characteristics of the polyethylene body are adequate for this purpose. In addition, however, the well 32 is arranged to contain the surface portions of sample liquid completely within the side walls of the insert and free of thermal contact with the container body 14.

In effect, therefore, the insert provides a mechanical separation between the main body of sample liquid and the surface portions, since the cooler temperatures resulting from the limited initial evaporative cooling of the surface portions are prevented from effecting heat transfer from the main body of sample liquid to the surface liquid either by convection currents or by direct conduction.

In order to direct the incoming liquid sample through the reduced portion and into the well, the insert is provided with an accurately machined peripheral sealing surface 35 below the lower extremity of the bore for cooperation with the container body at a point slightly below the mouth of the overflow passage 20 formed in the body. Preferably, a similar sealing surface 36 is provided on the insert above the bore 33 for cooperation with the container body at a point slightly above the mouth of the overflow passage. Adjacent its upper end, the insert is provided with a peripheral shoulder 37 for spacing the top flange 38 of the insert above the container body to provide a recess 39 that will accommodate a prying tool and facilitate removal of the insert.

It should be understood that the description of the preferred form of the invention is for the purpose of complying with Section 112, Title 35, of the U.S. Code and that the claims should be construed as broadly as prior art will permit.

I claim:

1. In combination, gravimetric weighing means having a bob of known weight and volume suspended therefrom by a tension member; a container having a reservoir for sample liquid with said reservoir being open at the top to receive and immerse said bob in said liquid; and an insert disposed in said reservoir and dividing said liquid into a main body portion in which said bob is immersed and a surface portion connected thereto by a passage through which said tension member extends, said passage being impermeable to convection currents in said liquid.

2. In apparatus for measuring liquid densities and including a gravimetric balance having a bob of known weight and volume suspended therefrom by a tension member, and a container body having a reservoir for sample liquid with said reservoir being open at the top to receive and immerse said bob in said liquid; an insert for mounting in said reservoir and having means in sealing cooperation with said body to divide said liquid into a main body portion for immersion of said bob and a surface portion connected to said main portion by a passage through which said tension member extends, said passage being impermeable to convection currents in said liquid resulting from evaporative cooling of said surface portion, and a cover for said reservoir, said cover having a passage through which said tension member extends.

3. In combination; gravimetric weighing means having a bob of known weight and volume suspended therefrom by a tension member; a container having a reservoir for sample liquid with said reservoir being open at the top to receive and immerse said bob in said liquid; and means forming an overflow passage communicating with said reservoir adjacent the top, said overflow passage having a liquid trap for receiving and storing liquid overflowing from said reservoir to render said overflow passage impermeable to flow of fluids of less density than said liquid.

4. In apparatus for measuring the density of volatile liquids having vapors denser than air; the combination with a gravimetric balance having a bob of known weight and volume suspended therefrom by a tension member; a container having a reservoir for sample liquid with said reservoir being open at the top to receive and immerse said bob in said liquid; and a cover for said reservoir, said cover having a passage through which said tension member extends; of means forming an overflow passage communicating with said reservoir adjacent the top, said overflow passage having a liquid trap for liquid overflowing said reservoir to block escape of vapors through said overflow passage.

5. In apparatus for measuring the density of volatile liquids having vapors denser than air and including a gravimetric balance having a bob of known weight and volume suspended therefrom by a tension member; a container body having a reservoir for sample liquid with said reservoir being open at the top to receive and immerse said bob in said liquid; and a cover for said reservoir, said cover having a passage through which said tension member extends; the improvement comprising an insert for mounting in said reservoir and having means in sealing cooperation with said body to divide said liquid into a main body portion for immersion of said bob and a surface portion connected to said main portion by a passage through which said tension member extends, said passage being impermeable to convection currents in said liquid resulting from evaporative cooling of said surface portion; and means forming an overflow passage communicating with said reservoir at the region of said surface portion.

6. In apparatus for the simultaneous measurement of the electron density and weight density of volatile liquids having vapors heavier than air; in combination, radiation emitting means, gravimetric weighing means having a bob of known weight and volume suspended therefrom by a tension member, a container body for sample liquid, said body being of high thermal conductivity and having an internal liquid circuit for maintaining said body at a selected temperature, a sample cell chamber adjacent said emitting means, a reservoir above said sample cell and communicating therewith, said reservoir being open at the top to receive and immerse said bob in said liquid, a liquid sample supply passage communicating with said sample cell chamber, and an overflow passage communicating with said reservoir and forming a liquid trap for liquid overflowing said reservoir to block escape of vapors through said overflow passage, an insert body of low thermal conductivity disposed in said reservoir and having means in sealing cooperation with said reservoir to divide the liquid therein into a main body portion for immersion of said bob, and a surface portion connected to said main portion by a passage through which said tension member extends, said last-mentioned passage being impermeable to convection currents in said liquid resulting from evaporative cooling of said surface portion, said insert body forming a well for holding said surface portion insulated from said container body and having a passage in communication with said overflow passage.

References Cited in the file of this patent

UNITED STATES PATENTS 1,800,532     Howard     Apr. 14, 1931

OTHER REFERENCES

The Review of Scientific Instruments, vol. 27, No. 5, May 1956, pp. 297–299.